No. 733,440. PATENTED JULY 14, 1903.
A. VREELAND.
PNEUMATIC TIRE.
APPLICATION FILED JULY 30, 1902.
NO MODEL.

No. 733,440. Patented July 14, 1903.

UNITED STATES PATENT OFFICE.

AARON VREELAND, OF SINGAC, NEW JERSEY.

PNEUMATIC TIRE.

SPECIFICATION forming part of Letters Patent No. 733,440, dated July 14, 1903.

Application filed July 30, 1902. Serial No. 117,676. (No model.)

*To all whom it may concern:*

Be it known that I, AARON VREELAND, a citizen of the United States, residing at Singac, county of Passaic, State of New Jersey, have invented certain new and useful Improvements in Pneumatic Tires with Shoes, fully described and represented in the following specification and the accompanying drawings, forming a part of the same.

The object of this invention is partly to produce a puncture-proof pneumatic tube and partly to facilitate the application to a pneumatic tube of a woven puncture-guard made in a straight strip. Such a straight strip requires a peculiar construction to bend around and inclose an inflated pneumatic tube. Canvas in a sufficient number of layers forms a most efficient puncture-guard, but is not adapted to wear unless the outer layer is coated with india-rubber, so as to resist moisture and abrasion. Such rubber-coated canvas is, however, necessarily made in flat layers, as the rubber is applied by calender-rolls, and such a flat piece of fabric cannot be readily fitted to the whole exterior of a round pneumatic tube. The present invention provides a means for conveniently securing such a guard about the pneumatic tube by making the guard encircle only the top and sides of the tire and attaching to the guard a base of thinner fabric of sufficient width to wholly encircle the tire, so that its edges may be sewed together upon the inner side of the same. The thinner fabric is readily bent to fit the sides and interior of the tire, which could not be done with a rubber-coated fabric. The complete tire thus consists of a thin rubber tube to contain the air and having the usual feed-valve, a plurality of woven coverings, with a rubber coating upon the outer covering and the inner covering of much thinner material than the outer to fit readily around the tube. Between the base and the rubber-coated shoe a padding of canvas strips may be readily inserted to protect the exterior of the tire and are effectively held in place by the two layers of fabric. Such canvas strips are attached to one another and to the base at alternate edges, which leaves them more free to adapt themselves to the curvature of the tire.

The invention is illustrated in the annexed drawings, in which—

Figure 1:
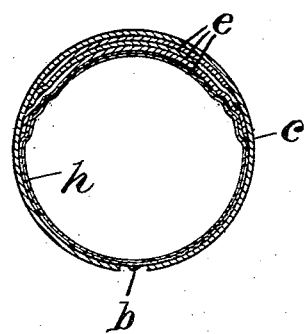
Figure 2:
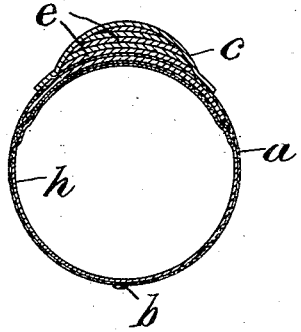
Figure 3:
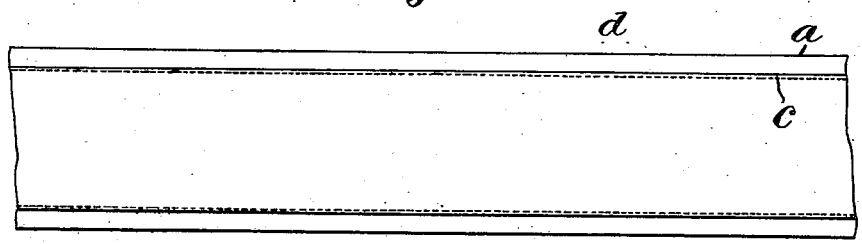
Figure 4:

Figure 1 is a cross-section of a tire having a wide rubber-coated shoe. Fig. 2 is a cross-section of a tire having a narrow rubber-coated shoe; Fig. 3, a plan, upon a reduced scale, of the shoe and base attached to one another; Fig. 4, a cross-section of the entire covering for the pneumatic tube shown in Fig. 1. Fig. 4 is upon the same scale as Figs. 1 and 2.

$a$ designates the base, of thin woven fabric, adapted to encircle the rubber tube and be united by stitches $b$ upon the inner side of the tube, as in Figs. 1 and 2. The rubber-coated layer $c$ forms the protective shoe and is shown of less width than the base $a$, and made in Figs. 1 and 4 wide enough to two-thirds encircle the tire and in Fig. 2 only wide enough to protect the outer edge of the tire. The layer $c$ is sewed or cemented at its opposite edges to the base $a$. The base and shoe are made of suitable length to extend around the whole periphery of the rubber tube $h$ and have their ends joined by stitching or otherwise, so as to form a complete envelop for a thin rubber tube. The tube would have a valve to introduce air in the usual manner; but the valve is not shown in the drawings, as it would obscure the joint $b$ of the base where its edges are sewed together in Figs. 1 and 2; but notches would be formed in the edges of the base which would clear the valve-stem where it projected from the inner side of the rubber tube. Three padding-strips $e$ are shown in Figs. 1 and 4, having their alternate edges sewed together and the inner one sewed at one edge to the base.

Where the shoe $c$ is made quite wide, as shown in Fig. 1, it forces the padding-strips $e$ into the outer surface of the rubber tube $h$; but where the shoe is made narrow, as in Fig. 2, the strips $e$ may form in conjunction with the shoe a species of pad upon the outer side of the tire. In Fig. 2 a couple of the padding-strips are also shown upon the inner side of the base $a$, which operate to press the tube $h$ inwardly upon the outer side; but such inner strips form no part of the present invention, which comprises the rubber-covered thick fabric forming the outer shoe c and attached to the thin flexible fabric a, which encircles the whole tube.

I have found that material like twilled muslin, which is much thinner than rubber-coated canvas, can be drawn into the shape of the tire quite readily and stitched smoothly together upon the inner side, and the attachment of the rubber-coated shoe to such thin base serves to draw the shoe into the requisite form and to hold it in position upon the tire. When the tire is completed, as shown in Figs. 1 and 2, it may be secured upon the wheel-rim by cement in the usual manner and the outer side of the rubber tube is protected from puncture by the rubber-coated shoe c and by the layers of padding.

My invention differs from previous constructions in forming a tire-guard in flat form, so that it may be readily packed and transported and bent to the curvature of the tire only when applied to the rubber tube and by the use of the thin flexible base a for the attachment of the rubber-covered shoe, which base bends readily to the curvature of the tire and may be at its edges sewed together by the stitches b by an ordinary thread and needle.

In practice the tire requires protection from puncture chiefly at the outer side, and the shoe c may therefore be, as in Fig. 2, made only about one-third or one-fourth the width of the base a and be readily bent to fit the outer side of the tire, while the base is bent to fit the entire curvature of the tire upon both the inner and outer sides.

I have explained the difficulty of forming rubber-coated canvas by calender-rolls except in flat layers, and my invention thus furnishes a means of uniting such readily-made layers of rubber-coated canvas into conjunction with a thin flexible base.

Having thus set forth the nature of the invention, what is claimed herein is—

A pneumatic tire having a thin air-tube and a protective covering formed of a flat woven base a and a thicker flat woven shoe c having a rubber coating and made of material of less width than the base and attached thereto at the edges, forming a pocket, with the padding of woven layers inside such pocket and such layers attached to one another and to the base at alternate edges, and the base being adapted to fit the curvature of the entire rubber tube and to be secured upon the tube by sewing the edges of the base together.

In testimony whereof I have hereunto set my hand in the presence of two subscribing witnesses.

AARON VREELAND.

Witnesses:
THOMAS S. CRANE,
C. F. CONNER.